United States Patent
Zeller

(10) Patent No.: US 7,689,200 B1
(45) Date of Patent: Mar. 30, 2010

(54) CONTROL SYSTEM FOR EMERGENCY CALLS PLACED BY MOBILE COMMUNICATION DEVICES

(75) Inventor: Victoria L. Zeller, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 600 days.

(21) Appl. No.: 11/561,439

(22) Filed: Nov. 20, 2006

(51) Int. Cl.
*H04M 11/04* (2006.01)
(52) U.S. Cl. .................. 455/404.1; 455/404.2
(58) Field of Classification Search .............. 455/404.1, 455/404.2
See application file for complete search history.

(56) References Cited

U.S. PATENT DOCUMENTS

| | | | |
|---|---|---|---|
| 6,225,944 B1 * | 5/2001 | Hayes | 342/357.1 |
| 2005/0213716 A1 * | 9/2005 | Zhu et al. | 379/45 |
| 2008/0014901 A1 * | 1/2008 | Motley et al. | 455/404.1 |

* cited by examiner

*Primary Examiner*—Barry W Taylor

(57) ABSTRACT

An emergency call system comprises a control system and a location system. The control system associates emergency call processing parameters with individual ones of a plurality of Public Safety Answering Points (PSAPs). The location system receives a call request for an emergency call placed by a mobile communication device. The emergency call is to be handled by one of the PSAPs. In response to the call request, the location system determines the emergency call processing parameters that are associated the one of the PSAPs handling the emergency call. The location system uses these associated emergency call processing parameters to process the emergency call.

18 Claims, 6 Drawing Sheets

CONTROL SYSTEM FOR EMERGENCY CALLS PLACED BY MOBILE COMMUNICATION DEVICES

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to control systems for call processors that process emergency calls from mobile communication devices.

2. Description of the Prior Art

FIG. 1 illustrates emergency call system 100 in an example of the prior art. Emergency call system 100 includes mobile communication device 101, communication network 102, location system 103, Global Positioning Satellite (GPS) system 104, and Public Safety Answering Points (PSAPs) 111-113.

Mobile communication device 101 communicates over the air with a sector of a cell site in communication network 102. Communication network 102 is coupled to location system 103 and PSAPs 111-113. Location system 103 is coupled to GPS system 104 and PSAPs 111-113. GPS system 104 and mobile communication device 101 exchange communications.

FIG. 2 illustrates an emergency call in an example of the prior art. Mobile communication device 101 places an emergency call to communication network 102—typically by calling 911. In response to receiving the emergency call from a mobile device, communication network 102 transfers a call request to location system 103. The call request indicates the cell site and the cell sector in communication network 102 that received the emergency call from mobile device 101.

In response to the request, location system 103 enters a database with the cell site and sector to yield an Emergency Service Routing Key (ESRK). The key is associated with the PSAP that will handle the emergency call to dispatch emergency responders. Location system 103 transfers the key to communication network 102. Communication network 102 routes the emergency call to the appropriate PSAP based on the key. Communication network 102 also transfers the key to the appropriate PSAP over the emergency call. In this example, communication network 102 routes the emergency call to PSAP 111 based on the key, and transfers the key to PSAP 111 over the emergency call.

In response to the emergency call, PSAP 111 transfers the key to location system 103. In response to the key from PSAP 111, location system 103 enters the database with the key to yield a location for mobile device 101. Location system 103 transfers the location for mobile device 101 to PSAP 111. In this example, the location is a "Phase I" location that is indicated by the street address of the cell site, the direction of the cell sector, and the size of the cell sector. PSAP 111 transfers this location to the responding emergency personnel.

FIG. 3 illustrates an emergency call in another example of the prior art. In this example, mobile communication device 101 has a GPS receiver to detect GPS signals. Mobile communication network 101 places an emergency call to communication network 102. In response to receiving the emergency call from mobile device 101, communication network 102 transfers a call request to location system 103. The call request indicates the cell site and cell sector in communication network 102 that received the emergency call. The call request also indicates that mobile device 101 has GPS capability.

Location system 103 enters a database with the cell site and cell sector to yield the key. Location system 103 transfers the key to communication network 102. Communication network 102 routes the emergency call to the appropriate PSAP based on the key, and transfers the key to the appropriate PSAP over the emergency call. In this example, communication network 102 transfers the emergency call and key to PSAP 111.

In response to the emergency call, PSAP 111 transfers the key to location system 103. In response to the key from PSAP 111, location system 103 enters the database with the key to yield the Phase I location (street address of the cell site, direction of the cell sector, and the size of the cell sector). Location system 103 transfers the Phase I location to PSAP 111.

In response to the emergency call from a mobile device with GPS capability, location system 103 transfers a GPS query that identifies mobile communication device 101 to GPS system 104. In response to the query, GPS system 104 transfers a GPS request to mobile communication device 101. In response to the request, mobile communication device 101 transfers a GPS response with GPS signal information to GPS system 104. GPS system 104 processes the GPS signal information to determine the GPS coordinates for mobile communication device 101. GPS system 104 transfers the GPS coordinates to location system 103. Location system 103 stores the GPS coordinates in association with the key.

In response to the emergency call from a device with GPS capability, PSAP 111 re-transfers the key to location system 103. In response to the re-transferred key, location system 103 enters the database with the key to yield the GPS coordinates for mobile device 101. Location system 103 transfers this location for device 101 to PSAP 111. In this example, the location is a "Phase II" location that is indicated by the GPS coordinates. PSAP 111 transfers the Phase I and II locations to the responding emergency personnel.

There are some constraints placed on location system 103. Location system 103 will not attempt to query GPS system 104 for GPS coordinates if the cell sector receiving the emergency call is classified as small. This classification is based on a sector sizing parameter. If the cell sector is smaller than the sector sizing parameter, then the cell sector is designated as small, and GPS coordinates are not determined for emergency calls from that cell sector.

When location system 103 obtains GPS coordinates for mobile device 101, location system 103 increases a GPS uncertainty factor for the GPS coordinates over time because device 101 could be moving. The increase is based on a GPS uncertainty parameter that is specified in meters per second. For example, if the GPS uncertainty parameter is 30 meters per second, and the GPS coordinates are four second old when provided to the PSAP, then location system 103 adds a GPS uncertainty factor of 120 meters (30 m/sec×4 sec) to the GPS coordinates. If the GPS uncertainty factor becomes too large, then location system 103 does not even transfer the GPS coordinates to the PSAP.

If location system 103 does not receive GPS coordinates from GPS system 104 within a specified time after its initial GPS query, then location system 103 will re-query GPS system 104. For example, if the GPS re-query parameter is 100 seconds, then location system 103 waits 100 seconds after its initial GPS query without any response before re-querying GPS system 104 for the GPS coordinates.

Location system 103 returns the key to communication network 102 after a key timing parameter. For example, if the key timing parameter is 100 milliseconds, then location system 103 waits 100 milliseconds before transferring the key to communication network 102. Unfortunately, communication network 102 may establish the voice path for the emergency call between mobile device 101 and PSAP 111 before mobile device 101 has finished interacting with GPS system 104. When mobile device 101 attempts to interact with GPS system 104 and handle the voice path at the same time, mobile device 101 may drop the voice path for the emergency call to PSAP 111.

Thus, there are various parameters that location system 103 uses to handle emergency calls. Note that one set of parameters may work well for one PSAP, but these parameters may not work so well for another PSAP. If the parameters do not work well for the other PSAP, then GPS locations may not be provided to the other PSAP on some emergency calls. When a precise GPS location is not provided, emergency responders must rely on the less precise Phase I location (cell site address, sector direction, and sector size). The lack of a precise GPS location could delay the emergency responders, and thus, could be the difference between life and death for the emergency caller.

For example, the above described parameters for PSAPs 111-113 could be:

Sector sizing parameter: 1000 meters;
GPS uncertainty parameter: 30 meter per second;
GPS re-query parameter: 100 seconds; and
Key delay parameter: 100 milliseconds.

These parameters may work well for PSAPs 111-112, but they may work poorly for PSAP 113. As a result, PSAP 113 may not get precise GPS locations for mobile devices with GPS capability. To address the problem, new parameters could be used for PSAPs 111-113 as follows:

Sector sizing parameter: 250 meters;
GPS uncertainty parameter: 10 meter per second;
GPS re-query parameter: 25 seconds; and
Key delay parameter: 2000 milliseconds.

The new parameters may work well for PSAPs 112-113, but they may work poorly for PSAP 111. Unfortunately, the current implementation of these parameters may block the use of GPS locations on emergency calls that should provide GPS locations. The failure to provide GPS locations on these emergency calls could have grave consequences for the caller.

SUMMARY OF THE INVENTION

Examples of the invention include an emergency call system and its method of operation. The emergency call system comprises a control system and a location system. The control system associates emergency call processing parameters with individual ones of a plurality of Public Safety Answering Points (PSAPs). The location system receives a call request for an emergency call placed by a mobile communication device. The emergency call is to be handled by one of the PSAPs. In response to the call request, the location system determines the emergency call processing parameters that are associated the one of the PSAPs handling the emergency call. The location system uses these associated emergency call processing parameters to process the emergency call.

In some examples of the invention, the control system maintains a data structure that associates the emergency call processing parameters with the individual ones of the PSAPs.

In some examples of the invention, the control system maintains a data structure that associates emergency services routing keys with the individual ones of the PSAPs.

In some examples of the invention, the control system maintains a data structure that associates emergency services routing keys with the emergency call processing parameters.

In some examples of the invention, one of the emergency call processing parameters comprises a sector sizing parameter.

In some examples of the invention, one of the emergency call processing parameters comprises a GPS uncertainty parameter.

In some examples of the invention, one of the emergency call processing parameters comprises a GPS re-query parameter.

In some examples of the invention, one of the emergency call processing parameters comprises a key delay parameter.

In some examples of the invention, the control system allows a user to specify the emergency call processing parameters on a per-PSAP basis.

In some examples of the invention, the location system is configured to process the emergency call using the associated emergency call processing parameters to obtain a GPS location of the mobile communication device that placed the emergency call.

BRIEF DESCRIPTION OF THE DRAWINGS

The same reference number represents the same element on all drawings.

DETAILED DESCRIPTION OF THE PREFERRED EMBODIMENT

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
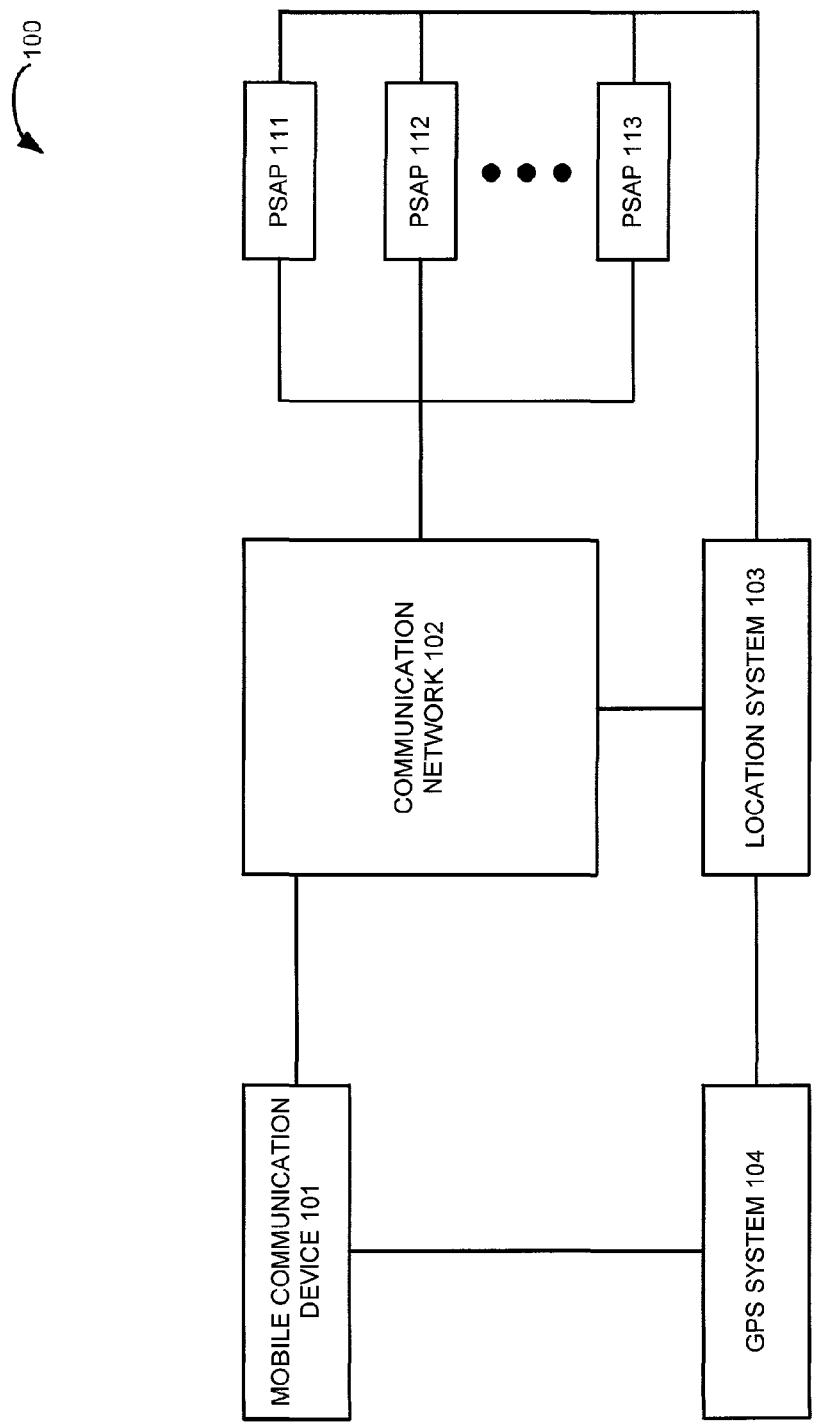
FIG. 1 illustrates an emergency call system in an example of the prior art.
Figure 2:
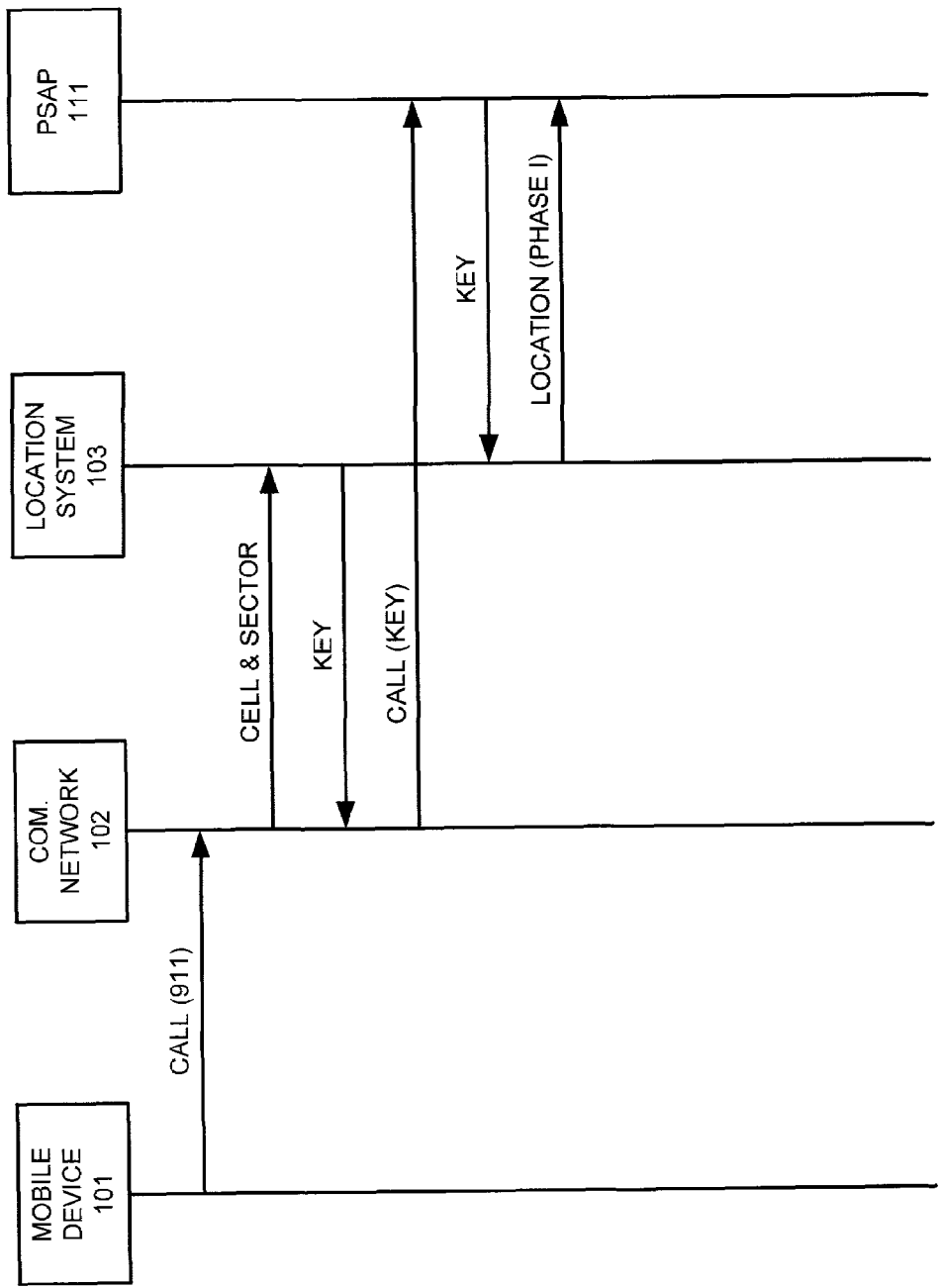
FIG. 2 illustrates an emergency call in an example of the prior art.
Figure 3:
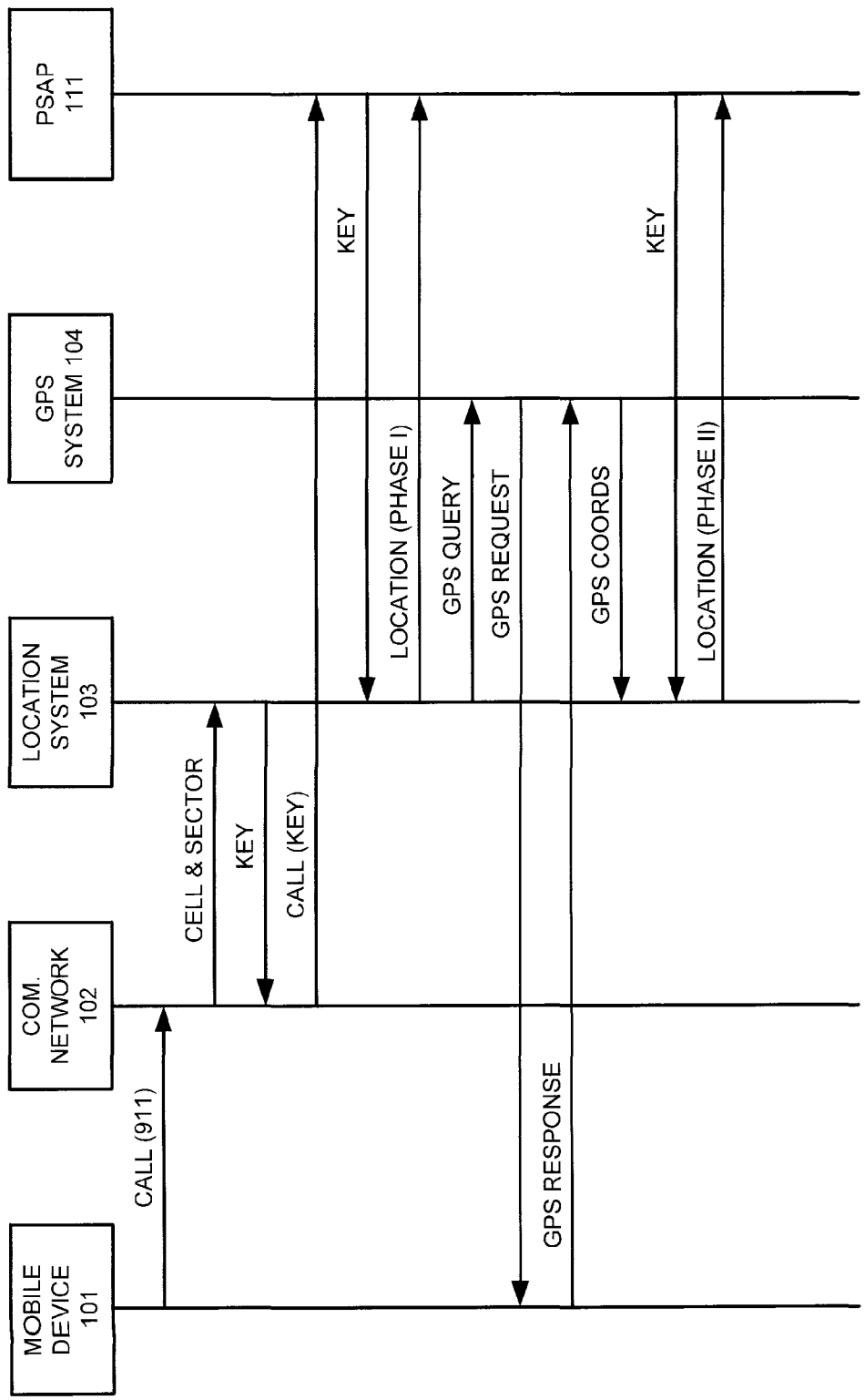
FIG. 3 illustrates an emergency call in an example of the prior art.
Figure 4:
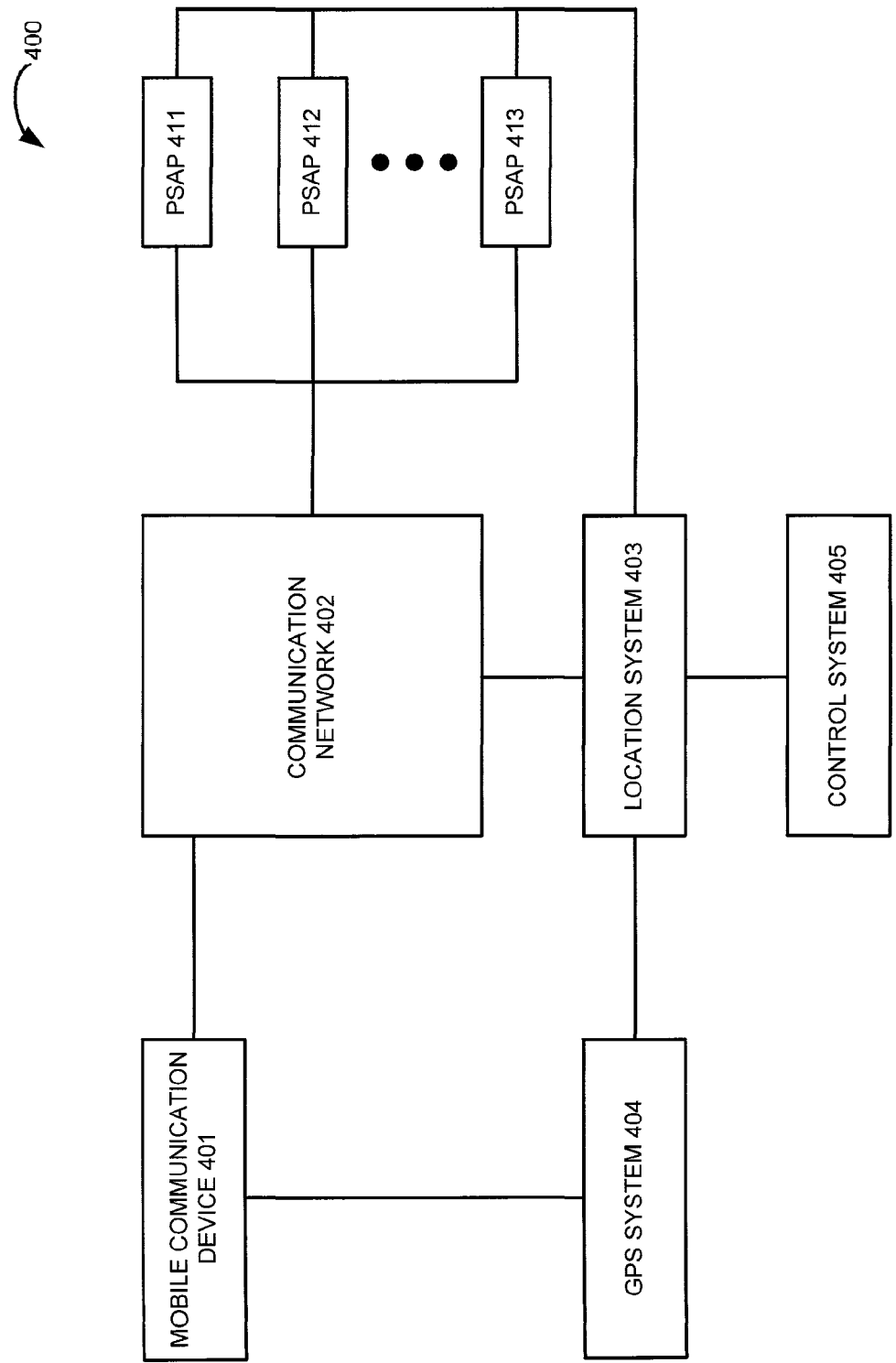
FIG. 4 illustrates an emergency call system in an example of the invention.

FIG. 4 illustrates emergency call system 400 in an example of the invention. Emergency call system 400 includes mobile communication device 401, communication network 402, location system 403, GPS system 404, control system 405, and Public Safety Answering Points (PSAPs) 411-413.

Mobile communication device 401 communicates over the air with a sector of a cell site in communication network 402. Communication network 402 is coupled to location system 403 and PSAPs 411-413. Location system 403 is coupled to GPS system 404, control system 405, and PSAPs 411-413. GPS system 404 and mobile communication device 401 exchange communications.

Mobile communication device 401 could be a wireless telephone, laptop computer, personal digital assistant, Internet appliance, or some other type of mobile communication device. Mobile communication device 401 can detect GPS signals. Communication network 402 includes wireless base stations, switching centers, and communication links. Location system 403 could be a computer system, such as a modified version of the MPC product provided by Open Wave Corporation. GPS system 404 could be a computer system, such as the PDE product provided by Open Wave Corporation. Control system 405 could be a computer system and is described in detail below. Control system 405 could be integrated within location system 403. PSAPs 411-413 could be conventional emergency call handling systems that dispatch emergency responders.

Figure 5:
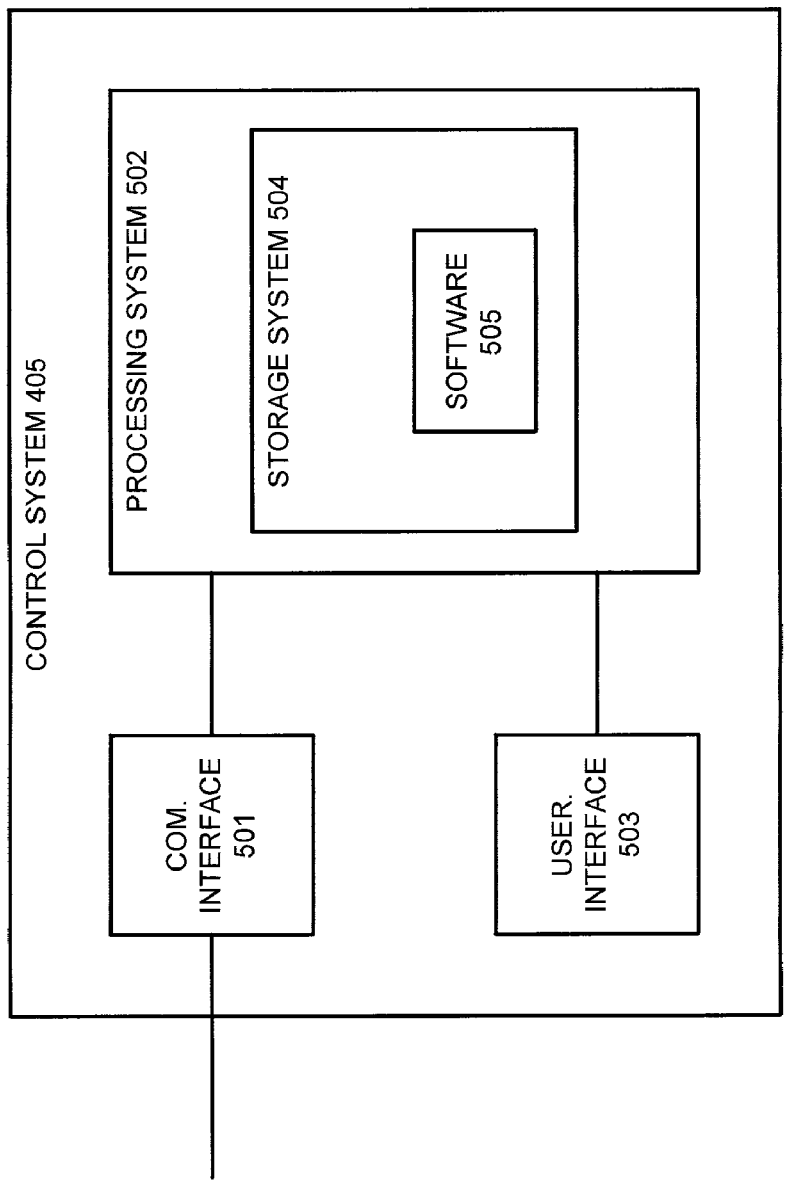
FIG. 5 illustrates a control system in an example of the invention.

FIG. 5 illustrates control system 405 in an example of the invention. Control system 405 includes communication interface 501, processing system 502, and user interface 503. Processing system 502 includes storage system 504. Storage system 504 stores software 505. Processing system 502 is linked to communication interface 501 and user interface 503. Control system 405 could be comprised of a programmed general-purpose computer, although those skilled in the art will appreciate that programmable or special purpose circuitry and equipment may be used. Control system 405 may use a client server architecture where operations are distributed among a server system and client devices that together comprise elements 501-505.

Communication interface 501 could comprise a network interface card, modem, port, or some other communication device. Communication interface 501 may be distributed among multiple communication devices. Processing system 502 could comprise a computer microprocessor, logic circuitry, or some other processing device. Processing system 502 may be distributed among multiple processing devices. User interface 503 could comprise a keyboard, mouse, voice recognition interface, microphone and speakers, graphical display, touch screen, or some other type of user device. Storage system 504 could comprise a disk, tape, integrated circuit, server, or some other memory device. Storage system 504 may be distributed among multiple memory devices.

Processing system 502 retrieves and executes software 505 from storage system 504. Software 505 may comprise an operating system, data structures, utilities, drivers, networking software, and other software typically loaded onto a general-purpose computer. Software 505 could comprise an application program, firmware, or some other form of machine-readable processing instructions. When executed by processing system 502, software 505 directs processing system 502 operate as described herein.

The following table illustrates a data structure in an example of the invention.

| DATA STRUCTURE FOR CONTROL SYSTEM 405 | | | | | |
|---|---|---|---|---|---|
| | | PARAMETERS | | | |
| KEY | PSAP | 1) SECTOR SIZING | 2) GPS UNCERTAINTY | 3) GPS REQUERY | 4) KEY DELAY |
| A | 411 | 1000 M | 10 M/S | 100 SEC | 100 mS |
| B | 412 | 500 M | 20 M/S | 50 SEC | 1000 mS |
| C | 413 | 250 M | 30 M/S | 25 SEC | 2000 mS |

In this example, the data structure comprises a portion of software 505 in control system 405. The data structure includes columns and rows in this example. The two columns on the left of the data structure associate individual keys (A, B, C, etc.) with individual PSAPs (411-413) in the same row. Typically, multiple keys are associated with each PSAP, but for clarity, only one key is associated with each PSAP in the data structure.

The remaining columns indicate parameters that are associated with the individual PSAPs in the same row. Although not shown for clarity, other items, such as cell sites, cell sectors, and Phase I locations could also be associated with individual PSAPs in the data structure. Thus, the data structure associates keys with specific PSAPs, and associates the specific PSAPs with various parameters.

In this example, parameters 1-4 respectively comprise: the sector sizing parameter, GPS uncertainty parameter, GPS re-query parameter, and key delay parameter. Note that the data structure could associate different or additional parameters with specific PSAPs. Also note that the data structure is an illustrative example, and may take various alternative forms that associate keys, PSAPs, and parameters.

In operation, a user operates control system 405 to specify individual parameters for individual PSAPs in the data structure. For example, the user may operate control system 405 to specify that the GPS uncertainty parameter for PSAP 411 is 10 meters per second, and to specify that the GPS uncertainty parameter for PSAP 412 is 20 meters per second. The user may specify other parameters in this manner. The user may also modify the parameters in the data structure.

Alternatively, the keys could be directly associated with the various parameters in an alternate data structure. Since the keys and the parameters are both associated with PSAPs, the parameters are still associated with specific PSAPs through their mutual association with the keys.

Figure 6:
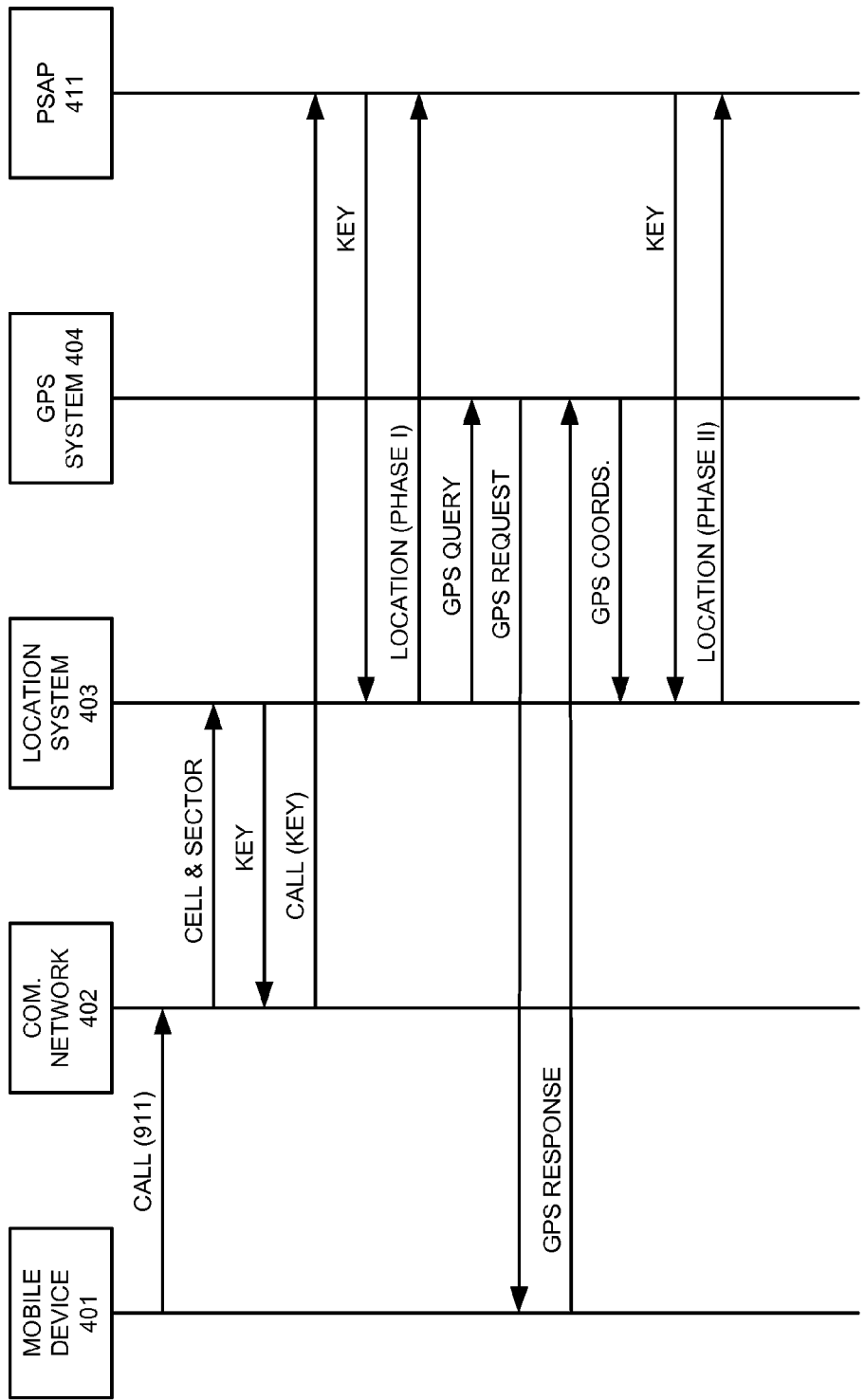
FIG. 6 illustrates an emergency call in an example of the invention.

FIG. 6 illustrates an emergency call in an example of the invention. Mobile communication network 401 places an emergency call to communication network 402. In response to receiving the emergency call from mobile device 401, communication network 402 transfers a call request to location system 403. The call request indicates the cell site and cell sector in communication network 402 that received the emergency call. The call request may also indicate that device 401 has GPS capability.

Location system 403 enters a database with the cell site and cell sector to yield the Emergency Service Routing Key (ESRK). This database could include the above described data structure. Location system 403 processes the data structure to retrieve the parameters that are associated with the PSAP that is associated with the key. Location system 403 uses the parameters to process the emergency call. Thus, the emergency call processing parameters may be specified and used on a per-PSAP basis.

Location system 403 transfers the key to communication network 402. Communication network 402 routes the emergency call to the appropriate PSAP based on the key, and transfers the key to the appropriate PSAP over the emergency call. In this example, communication network 402 transfers the emergency call and key to PSAP 411.

In response to the emergency call, PSAP 411 transfers the key to location system 403. In response to the key from PSAP 411, location system 403 enters the database with the key to yield the Phase I location (street address of the cell site, direction of the cell sector, and the size of the cell sector). Location system 403 transfers the Phase I location to PSAP 411.

In response to the emergency call from a mobile device with GPS capability, location system 403 transfers a GPS query that identifies mobile communication device 401 to GPS system 404. In response to the query, GPS system 404 transfers a GPS request to mobile communication device 401. In response to the request, mobile communication device 401 transfers a GPS response having GPS signal information to GPS system 404. GPS system 404 processes the GPS signal information to determine the GPS coordinates for mobile communication device 401. GPS system 404 transfers the GPS coordinates to location system 403. Location system 403 stores the GPS coordinates in association with the key.

In response to the emergency call from a device with GPS capability, PSAP 411 re-transfers the key to location system 403. In response to the re-transferred key, location system 403 enters the database with the key to yield the GPS coordinates for mobile device 401. Location system 403 transfers this location for mobile device 401 to PSAP 411. In this example, the location is a "Phase II" location that is indicated by the GPS coordinates. PSAP 411 transfers the Phase I and II locations to the responding emergency personnel.

Note that control system 405 allows the user to specify parameters per PSAP, and location system 403 implements the user-specified parameters per PSAP when processing emergency calls. The sector sizing parameter is used to establish if a cell sector is small, and since GPS coordinates are not determined for emergency calls from small sectors, the sector sizing parameter impacts the availability GPS coordinates on emergency calls. The GPS uncertainty parameter adds uncertainty to GPS coordinates over time, and since GPS coordinates that become too uncertain are not used, the GPS uncertainty parameter impacts of the availability of GPS coordinates on emergency calls. The GPS re-query parameter determines how quickly location system 103 can re-query GPS system 404 for GPS coordinates, and thus, the GPS re-query parameter impacts the availability of GPS coordinates on emergency calls. The key timing parameter controls how quickly a voice path is established by communication network 402, and since the simultaneous operations of determining GPS coordinates and handling the voice path can cause the mobile device to drop the emergency call, the key timing parameter impacts the availability of GPS coordinates on emergency calls.

Advantageously, the user may operate control system 405 to specify the appropriate parameters for each PSAP to maximize the availability of GPS coordinates on emergency calls. The availability of GPS coordinates on emergency calls helps emergency responders arrive more quickly than if only Phase I locations are provided. Thus, control system 405 can increase the availability of GPS coordinates on emergency calls, and as a result, help emergency responders save lives.

I claim:

1. An emergency call system comprising:
a control system configured to uniquely associate different values of emergency call processing parameters with individual ones of a plurality of Public Safety Answering Points (PSAPs), wherein the emergency call processing parameters comprise key delay parameters; and
a location system configured to receive a call request for an emergency call placed by a mobile communication device wherein the emergency call is to be handled by one of the PSAPs, and in response, to determine the emergency call processing parameters that are associated with the one of the PSAPs handling the emergency call, and to use these associated emergency call processing parameters to process the emergency call to increase the availability of GPS coordinates of the mobile communication device to the one of the PSAPs for the emergency call.

2. The emergency call system of claim 1 wherein the control system is configured to maintain a data structure that associates the emergency call processing parameters with the individual ones of the PSAPs.

3. The emergency call system of claim 2 wherein the control system is configured to maintain a data structure that associates emergency services routing keys with the individual ones of the PSAPs.

4. The emergency call system of claim 1 wherein the control system is configured to maintain a data structure that associates emergency services routing keys with the emergency call processing parameters.

5. The emergency call system of claim 1 wherein the emergency call processing parameters further comprise sector sizing parameters.

6. The emergency call system of claim 1 wherein the emergency call processing parameters further comprise GPS uncertainty parameters.

7. The emergency call system of claim 1 wherein the emergency call processing parameters further comprise GPS re-query parameters.

8. The emergency call system of claim 1 wherein the control system is configured to allow a user to specify the emergency call processing parameters on a per-PSAP basis.

9. The emergency call system of claim 1 wherein the location system is configured to process the emergency call using the associated emergency call processing parameters to obtain a GPS location of the mobile communication device that placed the emergency call.

10. A method of operating an emergency call system, the method comprising:
uniquely associating different values of emergency call processing parameters with individual ones of a plurality of Public Safety Answering Points (PSAPs), wherein the emergency call processing parameters comprise key delay parameters;
receiving a call request for an emergency call placed by a mobile communication device wherein the emergency call is to be handled by one of the PSAPs;
in response to the emergency call request, determining the emergency call processing parameters that are associated with the one of the PSAPs handling the emergency call; and using these associated emergency call processing parameters to process the emergency call to increase the availability of GPS coordinates of the mobile communication device to the one of the PSAPs for the emergency call.

11. The method of claim 10 further comprising maintaining a data structure that associates the emergency call processing parameters with the individual ones of the PSAPs.

12. The method of claim 11 further comprising maintaining a data structure that associates emergency services routing keys with the individual ones of the PSAPs.

13. The method of claim 10 further comprising maintaining a data structure that associates emergency services routing keys with the emergency call processing parameters.

14. The method of claim 10 wherein the emergency call processing parameters further comprise sector sizing parameters.

15. The method of claim 10 wherein the emergency call processing parameters further comprise GPS uncertainty parameters.

16. The method of claim 10 wherein the emergency call processing parameters further comprise GPS re-query parameters.

17. The method of claim 10 further comprising receiving the emergency call processing parameters specified on a per-PSAP basis from a user.

18. The method of claim 10 further comprising processing the emergency call using the associated emergency call processing parameters to obtain a GPS location of the mobile communication device that placed the emergency call.

* * * * *